United States Patent Office 3,497,111
Patented Feb. 24, 1970

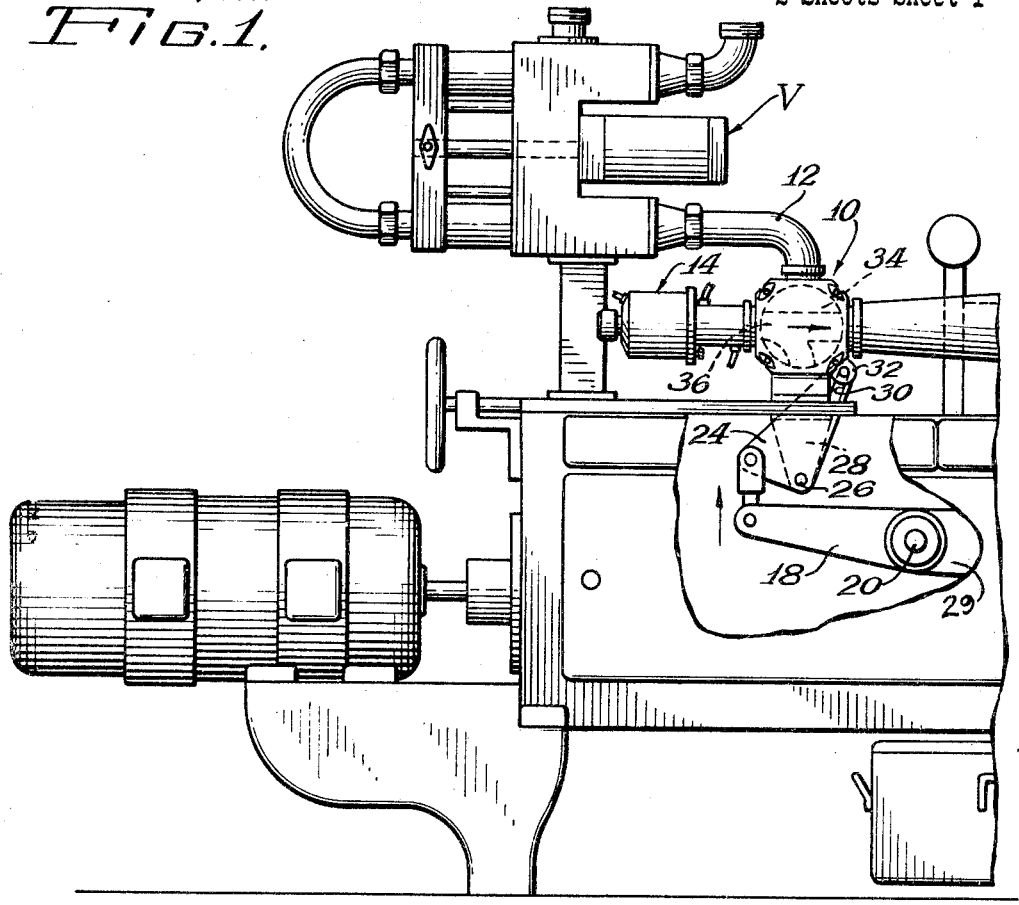
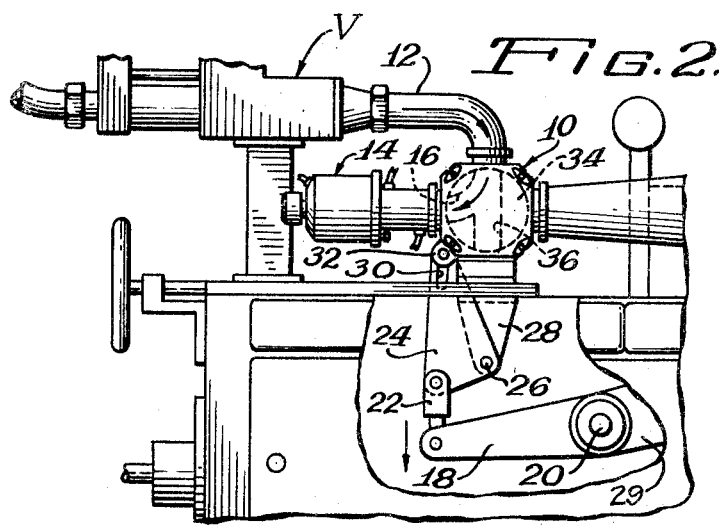

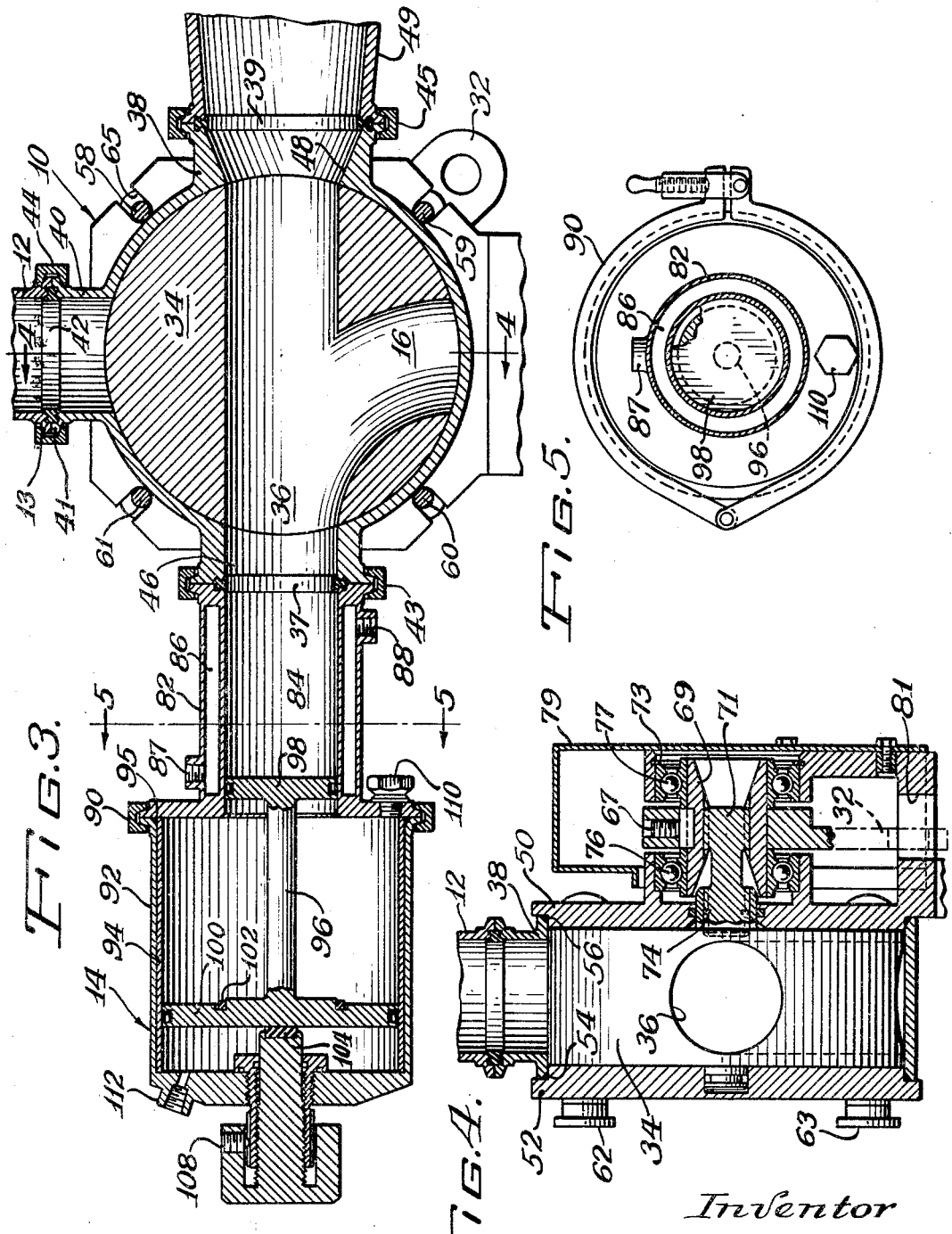

3,497,111
PRODUCT METERING APPARATUS
Russell C. Savage, Anderson, Ind., assignor to Lynch Corporation, a corporation of Indiana
Filed Feb. 26, 1968, Ser. No. 708,103
Int. Cl. B67d 5/62; G01f 11/00; F04b 19/22
U.S. Cl. 222—146                     3 Claims

ABSTRACT OF THE DISCLOSURE

A product metering apparatus which provides measured portions of margarine or butter for packaging. A semi-solid margarine or butter product is supplied through a first channel defined in a rotating, two-position valve and directed into a precisely dimensioned metering chamber. The valve is then rotated 90° to position a second channel leading from the metering chamber to the packaging machinery. An air activated piston acts on the margarine within the metering chamber forcing margarine through the second channel in the valve toward the packaging machinery. The stroke of the piston is adjustable to provide a precisely measured portion of margarine. The valve then rotates 90° in reverse so that the metering chamber may again be filled with margine passing through the first channel. The rotary valve operates to provide portions of margarine to the packaging machinery intermittently in sequence with the operation of the packaging machinery.

BACKGROUND OF THE INVENTION

This invention relates to an improved product metering apparatus which may be used in combination with a constant pressure and density product source that feeds an unpackaged product in semi-solid form into the improved apparatus from which it is subsequently discharged intermittently in measured portions to a packaging machine.

There are various product processing devices which may be used to receive and condition semi-solid margarine, butter or the like, to accurately meter the same in properly crystallized form, and, ultimately, to wrap the product in measured portions for shipment to consumers. Such a product conditioning and metering device is disclosed in the McVicker et al. Patent No. 3,057,286 issued Jan. 29, 1963.

In the device of McVicker, semi-solid margarine is provided at a constant pressure and density to a metering valve otherwise known as a product metering apparatus. The metering valve, in turn, emits measured amounts of the product to a cooling chamber and subsequently to a packaging machine. While the device of McVicker functions quite well for the purpose for which it is constructed, the metering valve is cumbersome, requiring many mechanical parts and adjustments to function properly. For these reasons an improved product metering apparatus is desirable.

SUMMARY OF THE INVENTION

In a principal aspect the present invention is the improvement in a product metering apparatus of a two-position valve in combination with product pump means adapted to expel measured portions of the product. The pump means receives a semi-solid product from a constant pressure source through a first channel of the two-position valve. The valve is then positioned to connect a second channel to the pump means so that measured portions of the product may be discharged therethrough by the pump to a packaging apparatus, for example. The valve is then returned to its original position and the measuring and pump cycle is repeated.

It is thus an object of the present invention to provide an improved product metering apparatus.

It is a further object of the present invention to provide an improved product metering apparatus which is adapted to receive butter, margarine or the like in a semi-solid form, to measure out uniform portions of said semi-solid product and to discharge said portions to the product packaging apparatus.

It is a further object of the present invention to provide a product metering apparatus which may be easily incorporated with existing product processing assembly lines.

These and other objects, advantages and features of the present invention will be more fully set forth in the detailed description which follows.

BRIEF DESCRIPTION OF THE DRAWINGS

In the description which follows, reference will be made to the following drawings in which:

FIGURE 1 illustrates the improved product metering apparatus in the discharge position;

FIGURE 2 represents the improved product metering apparatus in the filling or intake position;

FIGURE 3 is a cross sectional view of the pump and two-position valve means of the improved apparatus;

FIGURE 4 is a cross sectional view of the two-position valve means taken substantially along the lines 4—4 of FIG. 3; and FIGURE 5 is a cross sectional view of the pump taken substantially along the lines 5—5 in FIG. 3.

DESCRIPTION OF THE PREFERRED EMBODIMENT

FIGS. 1 and 2 of the drawings illustrate the improved pump and valve means of the invention combined with other components of a product metering and packaging device of a type previously known. Such components are described in McVicker et al., Patent No. 3,075,286, previously referred to, and the apparatus of the present invention may be incorporated to replace various components disclosed and/or claimed in McVicker.

With this in mind, the apparatus may be generally described by referring to the various component parts shown in FIG. 1. The symbol V generally refers to a trumpet valve which provides the product at a substantially constant pressure and a substantially constant density to a two-way valve 10 through the conduit 12. The details of the trumpet valve are more clearly shown by McVicker, Patent No. 3,075,286, previously cited. The valve 10 in combination with pump 14 comprises the primary portion of the product metering apparatus which is the subject matter of the appended claims. The product is divided by the pump and valve combination into measured portions and is subsequently discharged into cooling and packaging machinery (not shown). The cooling and packaging machinery would be positioned at the right hand side of the two-way valve 10 in FIG. 1. Packaging machinery of the type that might be used in this combination is shown in the Coon and Rapp Patent No. 2,592,793 of Apr. 15, 1952.

The sequence of operation and consequently the structure of the improved apparatus may be more fully understood by first referring to FIG. 2. In FIG. 2 the product passes from the trumpet valve V through the conduit 12, into the channel 16 in the two-way valve 10, and into the pump 14. Arrows indicate the direction of travel of the product. The internal construction of the pump 14 and valve 10 will be more fully described below.

The channel 16 is positioned to interconnect the conduit 12 and pump 14 by means of the arm 18 which pivots about an axis 20. A connecting rod 22 interconnects the arm 18 with a bell crank 24. The bell crank 24 swings about a pivot point 26 from a fixed plate member 28. Defined in the bell crank 24 opposite the pivot point 26 is a slot 30 which slidably engages a pin on the pivot arm 32. The pivot arm 32, in turn, is fixed to an internal rotary valve element 34 of the two-way valve 10.

When the arm 18 is pivoted in the downward direction as indicated by the arrow in FIG. 2, the bell crank 24 causes the valve element 34 to be rotated into the position shown in FIG. 2. This permits the product, which is supplied at a constant pressure continuously from the trumpet valve V, to enter into the pump 14. After the product is provided in a measured portion through the valve 10 to the pump 14, the arm 18 is directed upwardly as illustrated in FIG. 1. This causes the bell crank 24 to swing about the pivot point 26 and likewise causes the valve element 34 to rotate 90° so that a channel 36 provides a passageway from the pump 14 to the packaging apparatus (not shown). The pump 14 then forces the product out through the channel 36 toward the packaging machinery as indicated by an arrow in FIG. 1.

This sequence of operations is then repeated over and over to provide measured portions of product intermittently. The arm 18 is synchronized to pivot about the axis 20 in correspondence with the intermittent packaging operation of the packaging machinery (not shown). The synchronization of arm 18 is assured by the drive arm 29 which is operably connected with the packaging machinery. Thus for each item which is packaged the arm 18 will complete a cycle, passing up and down to subsequently discharge and refill the pump 14 and provide one measured portion of product to the packaging machinery.

The specific construction of the combination pump and valve is more fully illustrated in FIGS. 3 through 5. The two-position valve 10 includes a valve housing 38 adapted to receive a cylindrically shaped valve element 34. The valve housing 38 includes an upwardly extending product inlet aperture 40. The aperture 40 has a circular cross section and terminates with a flange 41 adapted to mate with a similar flange 13 on the inlet conduit 12. A seal 42 is inserted between the flanges 13 and 41 of the inlet conduit 12 and the opening 40. A clamp 44 holds the conduit 12 in intimate contact with the opening 40 of the valve housing 38.

The valve housing 38 also has a pump inlet aperture 46 leading to the pump 14 and a product outlet aperture 48 leading from the valve 10 toward product packaging machinery. The valve housing 38 interconnects with the pump 14 and outlet conduit 49 pump inlet aperture by means of clamps 43 and 45 and seals 37 and 39 in the manner previously described for the product inlet aperture 40.

The valve element 34 is cylindrically shaped as previously described and has two channels 16 and 36 passing through. Both channels have substantially circular cross sections. Channel 16 defines a right angle bend whereas channel 36 is substantially straight through valve element 34. Channel 16 and channel 36 are tangential and have a common portion which serves as the product inlet portion for channel 16 and the pump inlet portion for channel 36. Such a construction permits filling and emptying of the pump 14 with only a 90° rotation of the valve element 34.

With the channels 36 and 16 of the valve element 34 in the position shown in FIG. 3, a mounting bracket 50 and a cover plate 52 are secured to opposite sides of the valve element 34. An O-ring seal 54 is provided between the cover plate 52 and the valve housing 38. Similarly an O-ring seal 56 is provided between the mounting bracket 50 and the valve housing 38. The assembly is held together by carriage bolts 58, 59, 60 and 61 appropriately attached to nuts as at 62 and 63. The carriage bolts 58 through 61 are suitably inserted in slots, as at 65 for carriage bolt 58 in mounting bracket 50 and coverplate 52.

FIG. 4 illustrates the connection of the pivot arm 32 with the valve element 34. The pivot arm 32 is connected by means of a lock screw 67 to an annular shaft 69. The annular shaft 69 is, in turn, keyed with a drive shaft 71 which is secured to the valve element 34. Retaining rings 73 and 74 insure that the annular shaft 69 and drive shaft 71 will remain in properly aligned engagement with each other, the valve element 34 and the mounting bracket 50.

Circumferential bearings 76 and 77 facilitate rotation of the annular shaft 69 in the mounting bracket 50. A cover 79 suitably attached to the mounting bracket 50 protects the shaft arrangement. The pivot arm 32 may be freely rotated within the slot 81 provided in the mounting bracket 50 in the manner previously described to rotate the valve element 34 back and forth in a 90° arc.

The pump assembly generally shown at 14 in FIG. 3 includes a pump body 82 having an internal product receiving chamber 84 and an annular jacket 86. Water or other temperature conditioning fluids may be passed through the inlet and outlet openings 87 and 88 in the jacket 86 to provide cooling or warming in the chamber 84. Attached to the pump body 82 by a clamp 90 is the cylinder housing 92. The cylinder housing 92 has a cylinder 94 extending around its inner circumference. An O-ring 95 provides a sufficient seal between the pump body 82, the cylinder housing 92 and the cylinder 94.

A piston 96 is provided with first and second piston heads 98 and 100. Piston head 98 slidably engages the walls of the chamber 84 whereas piston head 100 engages the walls of the cylinder 94. Suitable seals are provided around the circumference of the piston heads 98 and 100 to improve the efficiency of the pump. An O-ring seal 102 is provided on the cylinder head 100 to engage the walls of the pump body 82 which are parallel to and adjacent the piston head 100.

A cushion stop 104, which is attached to an adjustable knob 106, is provided to engage the piston head 100 and to control the length of the stroke of the piston 96. A set screw 108 includes a spring loaded ball which engages a detent to hold adjustable knob 106 in position to stop the piston 96 in the desired position for the desired length of stroke. A breather plug 110 is provided into the chamber defined by the cylinder. A pressure inlet boss 112 is provided in the cylinder housing 92 adjacent the adjustable knob 106.

In operation the product is admitted through the conduit 12 and the channel 16 into the chamber 84. Admission of the product under pressure forces the piston 96 back toward the stop 104. Keeping in mind that the rotation of the valve element is controlled by the pivot arm 18 which, in turn, is synchronized with the packaging apparatus, after the chamber 84 is filled to the extent defined by the stroke of the piston head 98, the valve element is rotated 90° to the position shown in FIG. 3. Thereupon pressure, preferably at 120 p.s.i. acts on the piston head 100 through the pressure inlet boss 112, forcing the piston 96 to the right and consequently forcing the product through channel 36 toward the product packaging apparatus. The volume of product delivered is equal to the cross sectional area of the chamber 84 times the length of the stroke of the piston head 98. This amount of product is forced out through the valve element 34 since both channels 16 and 34 are compeltely filled during the pump filling operation. This results because the channels 16 and 36 are interconnected. This insures that the amount of material driven from the pump equals the amount delivered to the packaging machinery.

The pressure through the boss 112 acting on the piston head 100 is controlled by an external valve (not shown) timed properly to direct air flow into cylinder 94 against piston head 100. Likewise the pressure from the product source through the conduit 12 is kept substantially constant and great enough to push the piston 96 to the left thereby exhausting the air in the area behind the piston head 100, through the external valve (not shown).

In operation, the air pressure acting on the piston head 100 through the boss 112, is initially 120 p.s.i. with consumption of the air initially equal to about the volume of the chamber defined by the cylinder 94. After operation begins, however, the air in this chamber is admitted under pressure and then exhausted.

The apparatus of the present invention is designed primarily to receive a material in a semi-solid, viscous form and at a substantially constant density and then to divide the material into measurable predetermined portions in preparation for solidifying and final packaging. Generally the apparatus is used in the processing and packaging of margarine or butter products or the like; however, this is not to say that the uses are limited to such products.

The semi-solid, viscous material, such as margarine, is delivered from the circular cross-sectioned channels of the valve of the invention in measured portions. Simultaneously a like measured portion of margarine passes into a mold in the packing apparatus. The molded stick of margarine is then wrapped and packaged with like sticks of margarine.

The apparatus of the invention eliminates many cumbersome moving parts found in the prior art device as described in U.S. Patent No. 3,057,286. In addition, the presently claimed device is more easily adjusted and more dependable in service. The present device also requires less maintenance and consistently delivers a properly measured amount of material to the packaging apparatus.

What is claimed is:

1. In a product metering device for metering semi-solid butter, margarine and like products, said device adapted to receive said product from a substantially constant pressure and constant density product source and to discharge said product intermittently in premeasured portions at the same substantially constant density, the improvement comprising, in combination:

a cylindrical chamber adapted to receive said product and having a chamber piston for travel in said cylindrical chamber, a two-way valve having a valve housing, with a product inlet, a chamber inlet, and a product outlet, and a rotary valve element in said housing, said rotary valve element having a straight line cylindrical channel therethrough and an arcurate channel extending tangentially from one end of said straight channel to a position 90° from said one end of said straight channel, the diameter of said channels being equal to the diameter of said chamber and said inlets, said arcurate channel adapted to connect said inlets during filling of said chamber with said product and said straight channel interconnecting said chamber inlet and product outlet upon 90° rotation of said valve element for discharge of said product through said outlet.

a rotary drive mechanism connected to said valve element for rotating said element in response to operation of a product packaging machine external said device, and a fluid pressure pump comprising a cylinder and reciprocating piston mechanically connected with said chamber piston for coextensive movement therewith such that the stroke of said pump multiplied by the diameter of said chamber is equivalent to the premeasured portion of said product.

2. The device of claim 1 wherein said chamber includes means to adjust the length of piston stroke within said chamber to thereby vary the portion of said product directed from said chamber to said packaging apparatus whenever said straight channel is in position leading from said chamber to said producting packaging apparatus.

3. The improvement of claim 1 including a jacket surrounding said chamber, said jacket including means to provide continually circulating temperature control fluid about said chamber to heat and cool said product within said chamber means.

References Cited

UNITED STATES PATENTS

| | | | |
|---|---|---|---|
| 2,056,902 | 10/1936 | Longenecker | 103—153 X |
| 2,195,441 | 4/1940 | Bagby | 222—380 X |
| 2,558,887 | 7/1951 | Tesiero | 222—146 X |
| 3,385,479 | 5/1968 | Austin et al. | 222—334 X |
| 3,341,076 | 9/1967 | Wasilewski et al. | 222—334 X |
| 2,696,776 | 12/1954 | McBean et al. | 222—383 X |

SAMUEL F. COLEMAN, Primary Examiner

H. S. LANE, Assistant Examiner

U.S. Cl. X.R.

103—153; 137—625.47; 222—309, 334